No. 763,969.

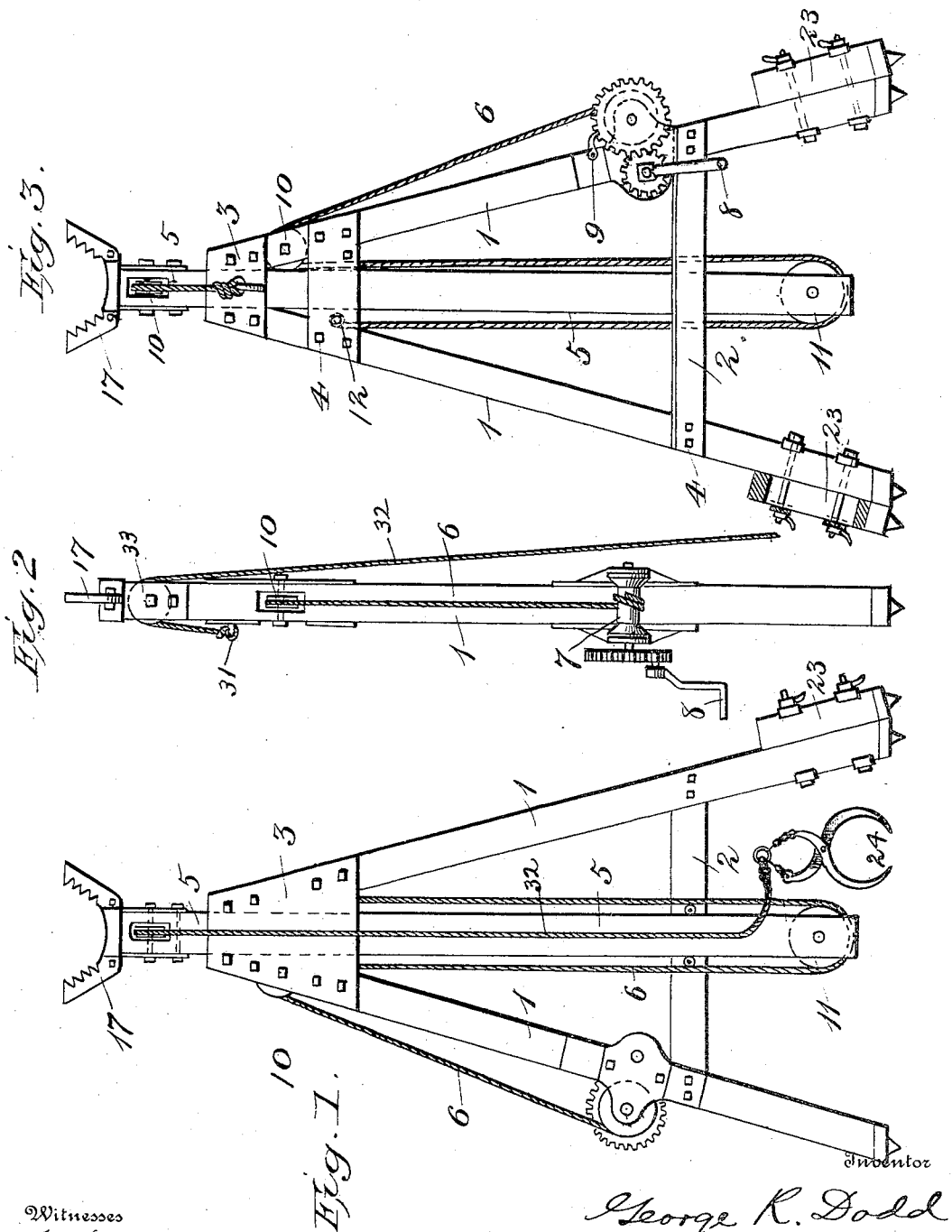

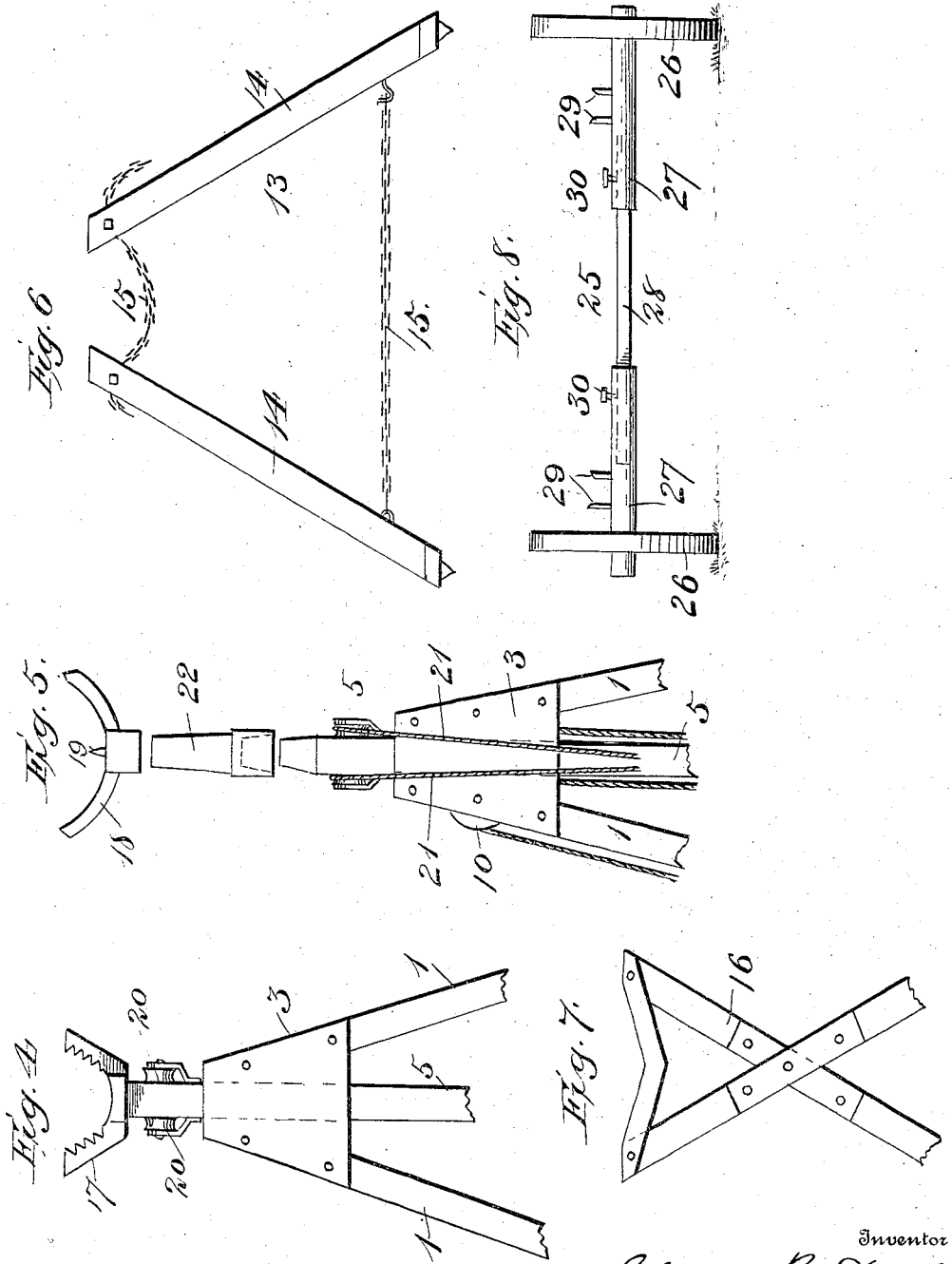

Patented July 5, 1904.

UNITED STATES PATENT OFFICE.

GEORGE R. DODD, OF ANDERSON, SOUTH CAROLINA.

POLE-HOISTER.

SPECIFICATION forming part of Letters Patent No. 763,969, dated July 5, 1904.

Application filed October 1, 1902. Serial No. 125,497. (No model.)

*To all whom it may concern:*

Be it known that I, GEORGE R. DODD, a citizen of the United States, residing at Anderson, in the county of Anderson and State of South Carolina, have invented certain new and useful Improvements in Pole-Hoisters, of which the following is a specification.

My invention relates to pole or timber hoisters, and is designed to raise telegraph-poles, timbers, iron beams, and the like in an easy and expeditious manner.

In the drawings forming a part of this specification, and in which like symbols of reference represent corresponding parts in the several views, Figure 1 is a side elevation of the device. Fig. 2 is a side view taken at right angles to Fig. 1. Fig. 3 is a view looking in an opposite direction from that shown in Fig. 1. Fig. 4 is a sectional view of a modified form, showing the pulleys at the sides of the pole instead of a central pulley in the same. Fig. 5 is a sectional view similar to Fig. 4 with a supplemental sleeve to lengthen the vertical rod. Fig. 6 is a view of a deadman or fork used in connection with the hoisting mechanism. Fig. 7 is a modified form of deadman, and Fig. 8 is a view of adjustable truck used in transporting the device.

The main body of the device is formed of legs 1, set at an angle toward each other and held in place by cross-pieces 2, back and front, and plates 3 on each side of the same. The usual bolts 4 or the like are provided.

5 is the vertical rod, adapted to be raised and lowered in the main frame by means of a rope or the like 6, running over a barrel or windlass 7, operated by a winch 8, and adapted to be locked by a pawl 9. The rope 6 passes over pulleys 10 and 11, journaled, respectively, in top of one of the legs 1 and in bottom of rod 5, and is connected by a pin or journal 12 to the main frame.

13 is a deadman or fork formed of rods 14, connected by chains 15, said chains being adjustable to conform to the work desired.

16 represents a modified form of deadman or fork; but my preferred form is the one generally used, as it has been found more efficient, conforming naturally to the inequalities of the ground upon which it is used.

17 is a toothed fork at top of pole 5, the object of the same being to receive the pole and hold the same thereon.

18 is a modified form of pole-receiver, being arc-shaped and having a spike 19 to take into the pole.

31 is a pin connecting rope 32 to the main frame, said rope passing over pulley 33.

20 represents pulleys located on each side of the pole 5, the same being used in lieu of pulley 33 when desired and having a plurality of ropes 21 passing from the pin 31 to tongs 24. This form is used when the timber 5 is of light construction and it is desired not to weaken the same by forming a hole or housing in the same for the pulley 10.

In Fig. 5 I have shown a modified form of pole 5, the same having a sleeve or the like 22, the object of the same being to lengthen or shorten the pole to conform to the particular work. Of course any number of these sleeves may be used as desired.

23 represents supplemental or adjustable feet for the legs of the device, formed with longitudinal slots and connected by screw-bolts, the object of the same being to adjust the same to agree with the inequalities of the ground. I may also use similar feet on the deadman or fork (shown in Fig. 7) and spikes at the base of the various legs and feet.

24 is a pair of tongs or the like adapted to grip the pole in the initial hoisting movement.

25 is a truck composed of wheels 26, sleeves 27, shaft 28, pins 29, and thumb-screws 30 to lock the shaft and the sleeves.

The operation of the device is as follows: When it is desired to raise the pole, the same is engaged by tongs 24, and the winch operated until the pole is raised sufficiently to place the deadman under the same. The fork 17 is then placed under the pole and the winch again operated, raising the pole, and by manipulating the same as the pole is raised the same may be placed in its desired position. When it is desired to transport the device, the same is placed on the truck 25, the legs 1 engaging or reposing within the pins 29 and the legs 1 acting as the handles of a push-cart. The sleeves and axle or shaft on the deadman permit the same to adjust automatically to the width of the legs 1 and the thumb-screws 30 locking the device when inoperative.

Having now fully described my invention, what I claim as new, and desire to secure by Letters Patent, is—

1. In a device of the character described, a main frame, a rod working in the same, a cable passing beneath the top of the rod and adapted to be operated by the same, and engaging means at the free end of the cable adapted to clutch the material to be lifted.

2. In a device of the character described, the combination with a main frame, of a vertical rod working in the same, means for operating the rod, a cable passing through the top of the rod and adapted to be operated by the same, and adjustable feet for the legs of the main frame.

3. In a device of the character described, a deadman composed of main legs connected by flexible bands, or the like.

4. In a device of the character described, the combination with the main frame, of a rod working in the same, a cable connected to the frame and passing beneath the rod, a windlass connected to the cable to operate the rod, a rope passing through the rod and connected to the frame, and clamping means at the free end of the rope to grip the material.

5. In combination with a pole-hoister, an adjustable truck, the same constructed with a telescoping axle, screws to hold the parts when adjusted, and pins upon the axle to receive the sides of the pole-hoister.

6. In a pole-hoister, the combination with the main frame, of a vertical rod working in the same, means for operating the rod, and an insertible sleeve at the top of the rod to lengthen or shorten the same.

In testimony whereof I affix my signature in presence of two witnesses.

GEORGE R. DODD.

Witnesses:
M. M. MATTISON,
JOS. J. FRETWELL.